United States Patent Office 3,432,515
Patented Mar. 11, 1969

3,432,515
METHOD OF PRODUCING BUTADIENE POLYMER HAVING HIGH PERCENTAGE OF CIS-1,4-CONFIGURATION
Eitaro Okuya, Yokkaichi-shi, Mie-ken, Adio Sakaguchi, Gifu-shi, Gifu-ken, and Kouei Komatsu, Tatsuhiko Kikuchi, Hidetoshi Yasunaga, and Kenichi Andueda, Yokkaichi-shi, Mie-ken, Japan, assignors to Japan Synthetic Rubber Co. Ltd., Tokyo, Japan
No Drawing. Filed June 23, 1966, Ser. No. 559,709
Claims priority, application Japan, July 2, 1965, 40/39,235
U.S. Cl. 260—94.3
Int. Cl. C08f 1/34
16 Claims

ABSTRACT OF THE DISCLOSURE

A process of producing a butadiene polymer having a high percentage of cis-1,4-configuration, which comprises contacting butadiene in the presence of a hydrocarbon solvent at a temperature between −20° C. and 150° C. under an inert gas atmosphere with a catalyst prepared by mixing (1) a compound of cobalt, (2) a halide of aluminum, and (3) an organotin compound having the general formula R'$_4$Sn wherein R' is an alkyl radical having 1 to 3 carbon atoms and a temperature between 0° C. and 120° C. under an inert gas atmosphere.

---

This invention relates to a method of producing cis-1,4-polybutadiene. More particularly it relates to a method of producing a butadiene polymer having a high percentage of cis-1,4-configuration with a novel catalyst.

There have heretofore been known many catalytic systems for producing cis-1,4-polybutadiene. Among these catalytic systems, most highly active ones contain as one component an organometallic compound of a metal of the group I, II or III of the periodic table. Well known examples are (i-C$_4$H$_9$)$_3$Al—TiI$_4$ (British Patent 848,065), (C$_2$H$_5$)$_2$AlCl—CoCl$_2$·(C$_5$H$_5$N)$_2$ (British Patent 916,000) and n-C$_4$H$_9$Li—TiI$_4$ (British Patent 931,579).

Since organometallic compounds which are one component of these catalytic systems are generally highly reactive, they react violently to decompose with a trace of moisture, oxygen and alcohols generating large quantities of heat. Therefore their handling accompanies many difficulties and a plant to be used for the polymerization reaction must be designed and operated so as to completely shut out air and moisture.

It is an object of this invention to provide a novel catalytic system containing an organotin compound which is not so sensitive to water and oxygen for the production of a butadiene polymer having a high percentage of cis-1,4-configuration.

Other objects and advantages of this invention will become apparent to one skilled in the art upon consideration of the accompanying disclosure.

We have now discovered that a butadiene polymer having a high percentage of cis-1,4-configuration can be produced by contacting butadiene in the presence of a hydrocarbon solvent at a temperature between −20° C. and 150° C. under an inert gas atmosphere with a catalyst prepared by mixing (1) a compound of cobalt, (2) a halide of aluminum selected from the group consisting of AlX$_3$ and RAlX$_2$ wherein X is a halogen atom and R is a hydrocarbon radical selected from the group consisting of alkyl and aryl, and (3) an organotin compound having the general formula R'$_4$Sn wherein R' is a hydrocarbon radical selected from the group consisting of alkyl having 1-3 carbon atoms, aryl, alkaryl and aralkyl, at a temperature between 0° C. and 100° C. under an inert gas atmosphere, preferably in a hydrocarbon solvent.

When in the present invention the said R' is alkyl, the resulting catalyst is evidently more excellent in stability and activity than those which result when the R' is otherwise.

There have been known three methods for polymerizing conjugated diolefins with catalysts containing organotin compounds. British Patent 827,365 discloses a method which comprises contacting a conjugated diolefin with a catalyst prepared by mixing (1) an organometallic compound of a metal selected from aluminum, tin, zinc, alkali metals and alkaline earth metals and (2) a compound of a heavy metal of from 4th to 10th position in the Deming's Periodic Table. The specification of this patent, however, neither describes nor suggests that a polybutadiene having a high percentage of cis-1,4-configuration can be obtained with any of these catalytic systems. British Patents 904,404 and 946,179 disclose that cis-1,4-polybutadiene can be produced with a catalytic system consisting of an organotin compound, an aluminum trihalide and a compound of cobalt. But these two methods are essentially different from the present method in the following points. Namely, the organotin compound used in the British Patent 909,404 is one having the general formula

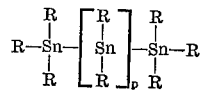

wherein P is zero or an integer and R is a hydrocarbon radical, and that used in the British Patent 946,179 is one having the general formula SnHxR$_{(4-x)}$ wherein $x$ is an integer of 1, 2 or 3 and R is a hydrocarbon radical.

It is a surprising result that when the said R' is an alkyl of 1 to 3 carbon atoms, a polymer having a high percentage of cis-1,4-configuration was obtained.

In both of the specifications, it is suggested that the catalytic system of the present invention will not be effective, because, according to the examples of the patents, the activity of the catalytic system consisting of tetra-n-butyl stannane, aluminum trichloride and cobalt naphthenate is poor for the polymerization of butadiene and the resulting polybutadiene has a low percentage (e.g., 11%) of cis-1,4-configuration.

Furthermore said organotin compounds having an Sn—Sn bond or Sn—H bond are unstable themselves, and they are immediately oxidized to decompose when they are contacted with oxygen in the air.

We have now unexpectedly discovered that the catalytic system of the present invention containing the organotin compound of the said general formula R'$_4$Sn$_n$ is effective for the production of a polybutadiene having a high percentage of cis-1,4-configuration. The organotin compounds of the present invention are not so sensitive to water and oxygen, contrary to the abovementioned organotin compounds used in the prior inventions. So the organotin compounds of the present invention can be handled easily and stored without being decomposed by water and oxygen. Further the polymerization reaction with the catalytic system of the present invention is carried out with good reproducibility.

Various cobalt compounds can be used irrespective of the valency state of cobalt as one component of the catalytic system of the present invention. Suitable cobalt compounds include cobalt carbonyl, hydrocobalt tetracarbonyl, cyclopentadienyl cobalt carbonyl, methanol dicobalt pentacarbonyl, dicyclopentadienyl cobalt dicarbonyl, dibutadiene cobalt dicarbonyl, triethoxy phosphine cobalt tricarbonyl, tribenzene tricobalt dicarbonyl bromide, cobalt dipyridyl, cobalt-tris-π-allyl, diacetylacetonyl cobalt, triacetylacetonyl cobalt, dicyclopentadienyl cobalt, dicyclopentadienyl hexamine cobalt, cobalt naphthenate, cobalt benzoate, cobalt parmitate, cobalt stearate, cobalt octate, cobalt oleate, cobalt linolate, cobalt linolenate, cobaltous chloride, cobaltous bromide, dipyridine cobaltous chloride, dipyridine cobaltous bromide, bis(triphenyl phosphine)cobaltous bromide, bis(diethyl phenyl phosphine)cobaltous bromide, bis(triethyl phosphine)cobaltous chloride and bis(triethyl phosphine)cobaltous bromide. Among these cobalt compounds, preferable are compounds which are soluble in hydrocarbon solvents to be used for the polymerization medium such as benzene and toluene.

Aluminum halides represented by the general formula $AlX_3$ include aluminum chloride, aluminum bromide and aluminum iodide. Aluminum halides represented by the general formula $RAlX_2$ include ethyl aluminum dichloride, ethyl aluminum dibromide, ethyl aluminum diiodide, n-propyl aluminum dichloride, isobutyl aluminum dibromide and phenyl aluminum dibromide.

Organotin compounds to be used in the present invention are compounds which are represented by the general formula $R'_4Sn$ wherein $R'$ is an alkyl radical having 1–3 carbon atoms, or is a hydrocarbon radical selected from the group consisting of aryl, alkaryl and aralkyl. The alkyl radicals can be either straight or branched chain radicals, for example, methyl, ethyl, n-propyl, and isopropyl. The aryl radicals include phenyl, biphenylyl, naphthyl and phenanthryl radicals. The alkaryl radicals include tolyl, xylyl and mesityl radicals. The aralkyl radicals include benzyl and phenethyl radicals. The hydrocarbon radicals in the aforementioned general formula can be the same or different. Examples of these organotin compounds are tetramethyl stannane, tetraethyl stannane, tetra-n-propyl stannane, methyl triethyl stannane, dimethyl diisopropyl stannane, tetraphenyl stannane, tetra-o-biphenylyl stannane, tetra-m-biphenylyl stannane, tetra-p-biphenylyl stannane, tetra-α-naphthyl stannane, tetra(9-phenanthryl) stannane, tetra-o-tolyl stannane, tetra-m-tolyl stannane, tetra-m-xylyl stannane, tetra-p-xylyl stannane, tetramesityl stannane, tetrabenzyl stannane, tetraphenethyl stannane, mesityl triphenyl stannane, tri-o-tolyl benzyl stannane, triphenyl α-naphthyl stannane, triphenyl m-xylyl stannane, triphenyl p-xylyl stannane, triphenyl benzyl stannane, triphenyl phenethyl stannane, tribenzyl ethyl stannane, triphenyl propyl stannane, triphenyl ethyl stannane, triethyl phenyl stannane, tripropyl phenyl stannane and dibenzyl methyl propyl stannane.

The catalyst of the present invention is prepared by mixing the three catalyst components in a hydrocarbon solvent at a temperature between 0° C. and 120° C. under an inert gas atmosphere.

The order of mixing of the three catalyst components is not critical, but it is preferable to mix first an aluminum halide and a cobalt compound, and then an organotin compound to the mixture. The catalyst may be prepared at any temperature between 0° C. and 120° C., but preferably at a tmeperature between 40° C. and 80° C.

One of the suitable methods of preparing the catalyst of this invention comprises mixing first a halide of aluminum and a cobalt compound in the presence of a small amount of a hydrocarbon solvent at a temperature between 40° C. and 80° C., maintaining the mixture at this temperature for from 5 to 120 minutes, and, after this aging, adding an organotin compound to the mixture.

The proportion of the catalyst components can be varied in a wide range, but the mole ratio of the sum of aluminum halides and organotin compounds to cobalt compounds is generally from 10:1 to 1,000:1. The mole ratio of aluminum halides to organotin compounds is generally from 0.01:1 to 10:1, preferably from 0.1:1 to 5:1.

A small amount of the catalyst may be enough for polymerizating butadiene to a high molecular weight solid polymer. When a compound of cobalt which is soluble in a hydrocarbon solvent is used, the amount of the catalyst is preferably from 0.005 to 0.1 milligram atom of cobalt based on the compound of cobalt per 1 mole of butadiene.

The polymerization reaction of this invention can be carried out either batchwise or continuously by contacting butadiene with the catalyst at a temperature between −20° C. and 150° C., preferably between 0° C. and 100° C. in the presence of a hydrocarbon solvent under an atmosphere of an inert gas such as nitrogen and argon.

Hydrocarbon solvents to be used for the catalyst preparation and polymerization reaction are aromatics such as benzene, toluene and xylene, aliphatics such as pentane, hexane, heptane, octane, nonane, decane, butane and propane, and alicyclics such as cyclohexane and cyclopentane. Aromatic hydrocarbons are most preferable.

The polymerization reaction is carried out in the presence of from about 0.5 to about 50 parts by volume of a hydrocarbon solvent per 1 part by volume of butadiene.

The polymerization reaction can be carried out under outogeneous pressure or any suitable pressure sufficient to maintain the reaction mixture substantially in the liquid phase.

At the completion of the polymerization reaction, the catalyst is inactivated by adding water, alcohol, acetone or other inactivating agents to the polymerization system. There is also added an antioxidant such as phenyl-β-naphthylamine into the polymerization system.

The resulting polybutadiene is coagulated by adding a poor solvent such as alcohol into the polymerization system, or by removing the solvent through steam distillation, and then is separated, washed and dried as usual.

Since a small amount of the catalyst is used, it is usually not necessary to eliminate the catalyst residues remaining in the polymer.

The polybutadiene thus produced has at least 70 percent of cis-1,4-configuration, and a polybutadiene having more than 90 percent of cis-1,4-configuration can be obtained under particular conditions.

The polybutadiene produced by the present invention can be compounded and vulcanized by any of the known method and used as a general purpose rubber in various fields.

A more comprehensive understanding of this invention can be obtained by referring to the following illustrative examples which are not intended, however, to be unduly limitative of the invention.

In the examples, the microstructure of polymers was analysed according to the D. Morers Method [Chimica é L' Industria, 91, 758 (1959)], by the infrared spectra analysis. Intrinsic viscosity $[\eta]$ (dl./g.) was measured at 30° C. in toluenet.

Examplet 1

According to the following recipe, butadiene was polymerized with the catalyst consisting of cobalt carbonyl, aluminum bromide and tetraethyl stannane.

Recipe:
Butadiene (mole) _____ 0.1
Benzene (ml.) _____ 40
Cobalt carbonyl (mmole) _____ 0.01
Aluminum bromide (mmole) _____ 0.20
Tetraethyl stannane (mmole) _____ Variable
Polymerization temperature (° C.) _____ 40
Polymerization time (hr.) _____ Variable Under nitrogen gas atmosphere, cobalt carbonyl dissolved in a small amount of benzene and aluminum bromide dissolved in a small amount of benzene were introduced into a 100 ml. pressure-resistant glass reaction vessel. Benzene was added into the vessel so that the total amount of benzene became 40 ml. The reaction vessel was maintained at 60° C. for 30 minutes. Then tetraethyl stannane and butadiene were added in this order into the reaction vessel.

Then the reaction vessel was tumbled in a thermostat at 40° C. When the polymerization reaction proceeded to the desired conversion, methanol containing phenyl-β-naphthyl amine was poured into the reaction vessel to precipitate a polymer produced. The polymer thus precipitated was washed with methanol and dried at 40° C. in vacuo. The results are shown in Table 1.

TABLE 1

| Experiment No. | $(C_2H_5)_4Sn$ (mmole) | Al/Co/Sn (mole ratio) | Reaction time (hr.) | Conversion (percent) | $[\eta]$ | Microstructure (percent) | | |
|---|---|---|---|---|---|---|---|---|
| | | | | | | Cis-1,4 | Trans-1,4 | Vinyl |
| 1 | 0.30 | 20:1:30 | 12.5 | 10.7 | 3.6 | 89.1 | 8.2 | 2.7 |
| 2 | 0.60 | 20:1:60 | 2 | 31.8 | 3.8 | 95.9 | 1.1 | 3.0 |
| 3 | 1.00 | 20:1:100 | 3.5 | 35.9 | 2.7 | 94.3 | 2.6 | 3.1 |
| 4 | 2.00 | 20:1:200 | 3.5 | 52.5 | 2.3 | 93.0 | 3.1 | 3.9 |

EXAMPLE 2

Butadiene was polymerized with similar procedures as in Example 1 except that 0.60 mole of tetraethyl stannane was used and the amount of aluminum bromide was varied. The results are shown in Table 2.

TABLE 2

| Experiment No. | AlBr₃ (mmole) | Al/Co/Sn (mole ratio) | Reaction time (hr.) | Conversion (percent) | $[\eta]$ | Microstructure (percent) | | |
|---|---|---|---|---|---|---|---|---|
| | | | | | | Cis-1,4 | Trans-1,4 | Vinyl |
| 5 | 0.20 | 20:1:60 | 0.67 | 27.2 | 3.55 | 93.9 | 2.7 | 3.4 |
| 6 | 0.30 | 30:1:60 | 0.33 | 53.3 | 3.75 | 94.1 | 2.8 | 3.1 |
| 7 | 0.60 | 60:1:60 | 1.0 | 48.8 | 2.60 | 90.7 | 6.3 | 3.0 |

EXAMPLE 3

Butadiene was polymerized with similar procedures as in Example 1 except that diacetylacetonyl cobalt was used instead of cobalt carbonyl. The results are shown in Table 3.

TABLE 3

| Experiment No. | $(C_2H_5)_4Sn$ (mmole) | Al/Co/Sn (mole ratio) | Reaction time (hr.) | Conversion (percent) | $[\eta]$ | Microstructure (percent) | | |
|---|---|---|---|---|---|---|---|---|
| | | | | | | Cis-1,4 | Trans-1,4 | Vinyl |
| 8 | 0.40 | 20:1:40 | 3.0 | 78.4 | 1.90 | 89.0 | 3.9 | 7.1 |
| 9 | 0.80 | 20:1:80 | 3.0 | 70.6 | 1.95 | 87.5 | 6.0 | 6.5 |
| 10 | 1.60 | 20:1:160 | 5.0 | 70.7 | 0.85 | 84.1 | 4.5 | 11.4 |

EXAMPLE 4

Example 3 was repeated except that triacetylacetonyl cobalt was used instead of diacetylacetonyl cobalt. The results are shown in Table 4.

TABLE 4

| Experiment No. | $(C_2H_5)_4Sn$ (mmole) | Al/Co/Sn (mole ratio) | Reaction time (hr.) | Conversion (percent) | $[\eta]$ | Microstructure (percent) | | |
|---|---|---|---|---|---|---|---|---|
| | | | | | | Cis-1,4 | Trans-1,4 | Vinyl |
| 11 | 0.40 | 20:1:40 | 20 | 17.8 | 1.80 | 89.1 | 4.1 | 6.8 |
| 12 | 0.80 | 20:1:80 | 4 | 52.0 | 0.80 | 86.4 | 4.2 | 9.4 |
| 13 | 1.60 | 20:1:160 | 5.5 | 60.0 | 0.40 | 81.2 | 4.4 | 14.4 |

EXAMPLE 5

Butadiene was polymerized with similar procedures as in Example 1 except that aluminum chloride was used instead of aluminum bromide and the amount of aluminum chloride was also varied. The results are shown in Table 5.

TABLE 5

| Experiment No. | $(C_2H_5)_4Sn$ (mmole) | AlCl₃ (mmole) | Al/Co/Sn (mole ratio) | Reaction time (hr.) | Conversion (percent) | $(\eta)$ | Microstructure (percent) | | |
|---|---|---|---|---|---|---|---|---|---|
| | | | | | | | Cis-1,4 | Trans-1,4 | Vinyl |
| 14 | 9.60 | 0.77 | 77:1:60 | 0.67 | 14.8 | 3.25 | 92.4 | 5.7 | 1.9 |
| 15 | 1.00 | 1.02 | 102:1:100 | 0.67 | 10.9 | 2.9 | 93.8 | 4.7 | 1.5 |
| 16 | 1.60 | 1.60 | 160:1:160 | 0.83 | 22.5 | 3.15 | 92.4 | 6.1 | 1.5 |

EXAMPLE 6

Butadiene was polymerized with similar procedures as in Example 1 except that 0.60 mmole of ethyl aluminum dibromide was used instead of 0.2 mmole of aluminum bromide. The results are shown in Table 6.

TABLE 6

| | | | | | | | | | |
|---|---|---|---|---|---|---|---|---|---|
| 17 | 0.40 | | 60:1:40 | 2.33 | 5.6 | 2.25 | 89.8 | 5.0 | 5.2 |
| 18 | 0.80 | | 60:1:80 | 2.33 | 22.0 | 2.90 | 91.2 | 3.7 | 5.1 |
| 19 | 1.60 | | 60:1:160 | 2.33 | 23.7 | 1.40 | 88.5 | 3.3 | 8.2 |

EXAMPLE 7

Butadiene was polymerized at 40° C. for 1 hour with similar procedures as in Example 1 except that 1.4 mmoles of organotin compounds shown in Table 7 were used instead of tetraethyl stannane and the amount of aluminum bromide was increased to 0.30 mmole. The results are shown in Table 7.

TABLE 7

| Experiment No. | Organotin compound | Conversion (percent) | [η] | Microstructure (percent) | | |
|---|---|---|---|---|---|---|
| | | | | Cis-1,4 | Trans-1,4 | Vinyl |
| 20 | (Methyl)₄Sn | 71.9 | 2.5 | 92.4 | 4.1 | 3.5 |
| 21 | (Isopropyl)₄Sn | 68.5 | 2.8 | 93.1 | 3.1 | 3.8 |
| 22 | (Phenyl)₄Sn | 22.5 | 2.5 | 94.8 | 3.0 | 2.2 |
| 23 | (α-Naphthyl)₄Sn | 20.5 | 2.0 | 90.7 | 4.9 | 4.4 |
| 24 | (m-Tolyl)₄Sn | 21.1 | 1.9 | 90.2 | 5.1 | 4.7 |
| 25 | (Mesityl)₄Sn | 19.4 | 1.6 | 88.4 | 4.3 | 7.3 |
| 26 | (Benzyl)₄Sn | 23.6 | 2.1 | 89.6 | 5.2 | 5.2 |
| 27 | (Phenyl)₄Sn | 23.0 | 2.4 | 91.5 | 4.6 | 3.9 |

EXAMPLE 8

Butadiene was polymerized with similar procedures as in Example 1 except that n-heptane was used instead of benzene and the amount of aluminum bromide was increased to 0.30 mmole and that 0.40 mmole of tetraethyl stannane was used.

The polymerization reaction was carried out at 40° C. for 45 hours and gave a polymer having a intrinsic viscosity of 0.85 with a conversion of 9.4%. The microstructure of the polymer was 71.0% of cis-1,4, 22.9% of trans-1,4 and 6.1% of vinyl.

EXAMPLE 9

Butadiene was polymerized at 40° C. for 1 hour with similar procedures as in Example1 except that cobalt stearate was used instead of cobalt carbonyl and 0.80 mmole of tetraethyl stannane was used. Polybutadiene was obtained with a conversion of 53.8%. The intrinsic viscosity was 2.25. The microstructure of the polymer was 92.7% of cis-1,4, 2.5% of trans-1,4 and 4.9% of vinyl.

EXAMPLE 10

Butadiene was polymerized at 40° C. for 9 hours with similar procedures as in Example 1 except that bis(triphenyl phosphine)cobaltous bromide was used instead of cobalt carbonyl and 0.80 mmole of tetraethyl stannate was used. A butadiene polymer having an intrinsic viscosity of 0.61 was produced with a conversion of 44.5%. The microstructure of the polymer was 94.8% of cis-1,4, 2.6% of trans-1,4 and 2.6% of vinyl.

EXAMPLE 11

Experiment No. 2 in Example 1 was repeated except that the polymerization reaction was carried out at 20° C. for 90 hours. A butadiene polymer having an intrinsic viscosity of 4.56 was obtained with a conversion of 26.0%. The microstructure of the polymer was 93.9% of cis-1,4, 2.6% of trans-1,4 and 3.5 % of vinyl.

EXAMPLE 12

Experiment No. 2 in Example 1 was repeated except that the catalyst was prepared by maintaining the mixture of cobalt carbonyl and aluminum chloride at 20° C. for 1 hour and then adding tetraethyl stannane into the mixture, and that the polymerization reaction was carried out for 3 hours. A butadiene polymer having an intrinsic viscosity of 3.67 was obtained with a conversion of 15.5%. The microstructure of the polymer was 94.3% of cis-1,4, 3.0% of trans-1,4 and 2.7% of vinyl.

EXAMPLE 13

Experiment No. 2 in Example 1 was repeated except that the catalyst was prepared by mixing the three catalyst components at the same time and then maintaining the mixture at 60° C. for 30 minutes, and that the polymerization reaction was carried out for 3 hours. A butadiene polymer having an intrinsic viscosity of 4.04 was obtained with a conversion of 9.2%. The microstructure of the polymer was 94.8% of cis-1,4, 2.6% of trans-1,4 and 2.6% of vinyl.

What is claimed is:

1. A method of producing a butadiene polymer having a high percentage of cis-1,4-configuration, which comprises contacting butadiene in the presence of a hydrocarbon solvent at a temperature between −20° C. and 150° C. under an inert gas atmosphere with a catalyst prepared by mixing (1) a compound of cobalt, (2) a halide of aluminum selected from the group consisting of $AlX_3$ and $RAlX_2$, in the general formulae X being a halogen atom and R being a hydrocarbon radical selected from the group consisting of alkyl and aryl, and (3) an organotin compound having the general formula $R'_4Sn$ wherein $R'$ is an alkyl radical having 1–3 carbon atoms, at a temperature between 0° C. and 120° C. under an inert gas atmosphere.

2. A method of producing a butadiene polymer having a high percentage of cis-1,4-configuration, which comprises contacting butadiene in the presence of a hydrocarbon solvent at a temperature between −20° C. and 150° C. under an inert gas atmosphere with a catalyst prepared by mixing (1) a compound of cobalt, (2) a halide of aluminum selected from the group consisting of $AlX_3$ and $RAlX_2$, in the general formulae X being a halogen atom and R being a hydrocarbon radical selected from the group consisting of alkyl and aryl, and (3) an organotin compound having the general formula $R'_4Sn$ wherein $R'$ is a hydrocarbon radical selected from the group consisting of aryl, alkaryl and aralkyl, at a temperature between 0° C. and 120° C. under an inert gas atmosphere.

3. A method according to claim 1 wherein the polymerization reaction is carried out at a temperature between 0° C. and 100° C.

4. A method according to claim 1 wherein the compound of cobalt is a compound selected from the group consisting of cobalt carbonyl, diacetylacetonyl cobalt, triacetylacetonyl cobalt, cobalt stearate and bis(triphenyl phosphine)cobaltous bromide.

5. A method according to claim 1 wherein the halide of aluminum is a compound selected from the group consisting of aluminum chloride, aluminum bromide and ethyl aluminum dibromide.

6. A method according to claim 1 wherein the organotin compound is a compound selected from the group consisting of tetramethyl stannane, tetraethyl stannane and tetraisopropyl stannane.

7. A method according to claim 2 wherein the organotin compound is tetraphenyl stannane.

8. A method according to claim 1 wherein the mole ratio of the halide of aluminum to the organotin compound is in the range of 0.01:1 to 10:1 and the mole ratio of the sum of the halide of aluminum and the organotin compound to the compound of cobalt is in the range of 10:1 to 1,000:1.

9. A method according to claim 1 wherein the amount of the catalyst is in the range of 0.005 to 0.1 milligram atom of cobalt based on the compound of cobalt per 1 mole of butadiene.

10. A method according to claim 1 wherein the hydrocarbon solvent is an aromatic hydrocarbon solvent.

11. A method according to claim 2 wherein the polymerization reaction is carried out at a temperature between 0° C. and 100° C.

12. A method according to claim 2 wherein the compound of cobalt is a compound selected from the group consisting of cobalt carbonyl, diacetylacetonyl cobalt, triacetylacetonyl cobalt, cobalt stearate and bis(triphenyl phosphine)cobaltous bromide.

13. A method according to claim 2 wherein the halide of aluminum is a compound selected from the group consisting of aluminum chloride, aluminum bromide and ethyl aluminum dibromide.

14. A method according to claim 2 wherein the mole ratio of the halide of aluminum to the organotin compound is in the range of 0.01:1 to 10:1 and the mole ratio of the sum of the halide of aluminum and the organotin compound to the compound of cobalt is in the range of 10:1 to 1,000:1.

15. A method according to claim 2 wherein the amount of the catalyst is in the range of 0.005 to 0.1 milligram atom of cobalt based on the compound of cobalt per 1 mole of butadiene.

16. A method according to claim 2 wherein the hydrocarbon solvent is an aromatic hydrocarbon solvent.

References Cited

UNITED STATES PATENTS 3,222,348  12/1965  Duck et al. _____ 260—94.3

JOSEPH L. SCHOFER, *Primary Examiner.*

R. A. GAITHER, *Assistant Examiner.*